Figure 1:
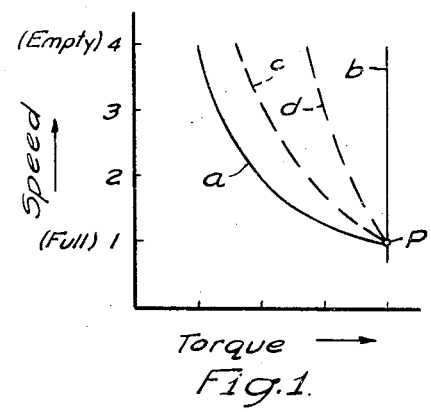

July 19, 1949. A. T. BACHELER 2,476,796
CORE-TYPE REEL DRIVE

Filed Oct. 31, 1947 3 Sheets-Sheet 1

WITNESSES:
E. A. M?Closkey
New. C. Groome

INVENTOR
Albert T. Bacheler.
BY
Paul E. Friedemann
ATTORNEY

July 19, 1949. A. T. BACHELER 2,476,796
CORE-TYPE REEL DRIVE
Filed Oct. 31, 1947 3 Sheets-Sheet 2

WITNESSES:
E. A. McCloskey
Nw. C. Groome

INVENTOR
Albert T. Bacheler.
BY
Paul E. Friedemann
ATTORNEY

Patented July 19, 1949

2,476,796

UNITED STATES PATENT OFFICE 2,476,796

CORE-TYPE REEL DRIVE

Albert T. Bacheler, Pittsburgh, Pa., assignor to Westinghouse Electric Corporation, East Pittsburgh, Pa., a corporation of Pennsylvania Application October 31, 1947, Serial No. 783,315

14 Claims. (Cl. 318—6)

My invention relates to variable voltage (Ward Leonard) drive systems for winding material on a reel core.

Customary core-type reel drives of this kind wind the material under constant pull or tension. This performance is secured, for instance, by regulating the field excitation of the motor for constant horsepower of the reel-drive motor.

Such constant-tension drives have been found to be unsatisfactory for winding cellophane and similar films since the inside portion of the rolled-up material next to the driven core is often crushed by pressure occurring when the reel approaches full diameter.

Self-regulating variable voltage drives are also available for operating the drive motor at constant torque. This performance is obtained, for instance, by series-connecting in the motor armature circuit the armature of a regulating generator which regulates the motor armature voltage for constant current, the motor field being constant so that the driving torque is proportional to the regulated current. When using a constant-torque drive for winding purposes, the tension in the material decreases as the reel diameter is building up.

Such constant-torque drives, while avoiding the above-mentioned damaging effects of constant-tension drives on cellophane or the like material, may lead to unevenly wound and excessively loose reels of material because winding pull and tension decline in inverse proportion to the increase in roll diameter which is a too rapid rate for satisfying actual requirements. For instance, for reels with a ratio 4:1 of full and empty reel core diameters, the tension at the end of the winding performance is only one-quarter of the tension with which the inner layers are wound.

It is, therefore, an object of my invention to provide variable-voltage reel drives that, when operating with cellophane and similar film material, are capable of producing evenly built-up rolls of material while safely preventing damage to the material.

Another object of the invention is to secure a winding performance under varying tension and varying torque and in accordance with a predetermined speed-torque characteristic which is intermediate between constant-tension and constant-torque, and it is also an object of my invention to permit adjusting or changing the rate at which the tension changes with the reel diameter.

Still another object of my invention is to design the variable-voltage system of a core-type reel drive in such a manner that the same regulator or generator that governs the normal winding performance is also effective, under selective control by the operator, to regulate the empty reel speed of the drive motor for maintaining a given maximum speed value to facilitate threading a new reel without reduction of material production speed.

These and more specific objects, as well as the means provided by my invention for achieving these objects, will be apparent from the following description in conjunction with the drawings in which Figure 1 is an explanatory coordinate diagram showing typical speed-torque characteristics, while Figs. 2, 3, 4 and 5 represent circuit diagrams of four different embodiments, respectively, of the invention.

In the schematic speed-torque diagram of Fig. 1, curve $a$ is a typical characteristic of a reel drive controlled for constant tension, for instance by regulating the generator field excitation of the Ward Leonard drive for constant horsepower output of the motor. The torque varies in inverse proportion to the speed so that curve $a$ is a hyperbola. Curve $b$ is a typical constant-torque characteristic as obtained, for instance, by regulating the motor armature voltage for constant current. In contrast thereto, the invention secures a characteristic of variable tension and simultaneously variable torque which (with intersection P arbitrarily chosen) lies between the characteristics $a$ and $b$ and is appreciably different from both, for instance as represented by curve $c$ or $d$; and the invention also affords selecting and varying the characteristic within the range determined by curves $a$ and $b$ to adjust the winder for different requirements of particular jobs.

According to my invention, a Ward Leonard drive is fundamentally designed for operating the motor at constant torque as typified by curve $b$, and a corrective control is superimposed which modifies the characteristic toward a constant-tension or constant horsepower characteristic (Figs. 2, 3, 4 and 5).

Figure 2:
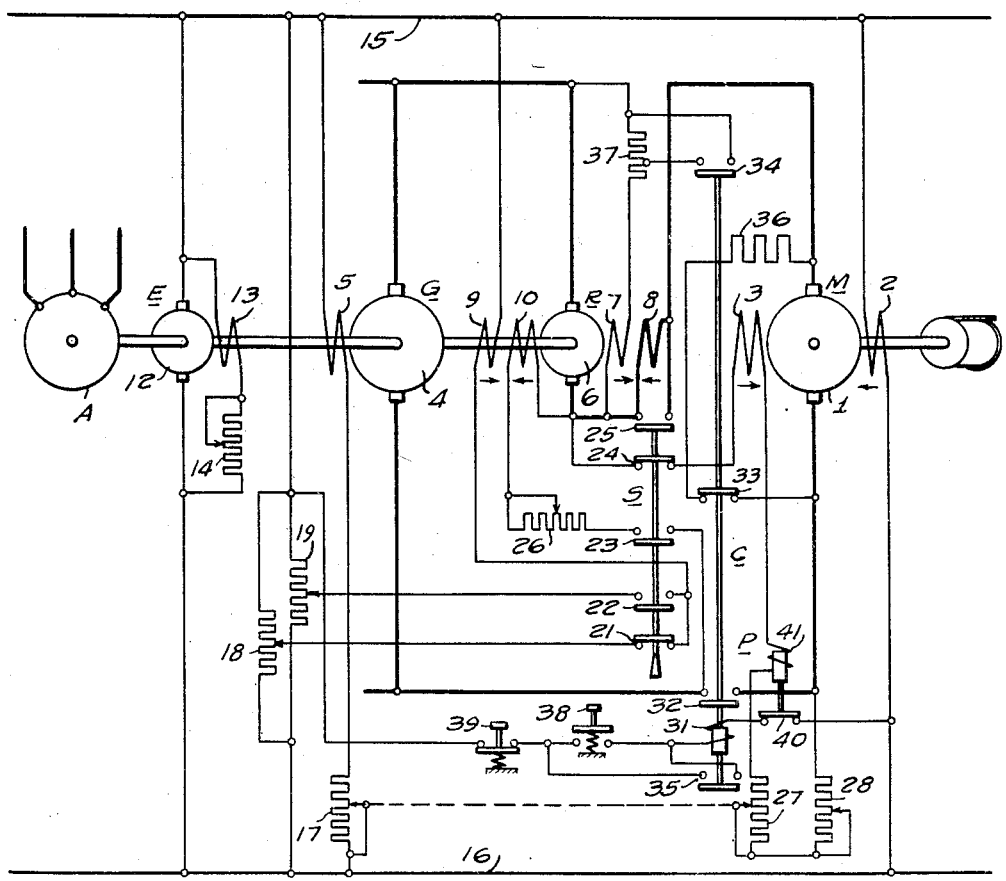

In Fig. 2, the reel drive motor is denoted by M and the appertaining armature by 1. Motor M has a main field winding 2 and a differential field winding 3. The motor armature is energized by variable voltage from the armature 4 of a main generator G with a separately excited field winding 5. Generator G may serve to energize other drive motors of sectional drive equipment.

Series-connected with motor armature 1 and main generator armature 4 is the armature 6 of a regulating generator R. In the illustrated example, generator R has a self-excited shunt field winding 7, a main pilot field winding 8, a pattern field winding 9, and an auxiliary pilot field winding 10. The pattern field winding is poled for differential action as regards pilot field windings 8 and 10.

Generators G and R operate at constant speed and may be driven by a single motor as represented at A. The same motor A may drive the armature 12 of an exciter which is shown to have a field winding 13 shunt-excited through a voltage-adjusting rheostat 14. The constant-voltage buses of the exciter are denoted by 15 and 16. The buses 15 and 16 may serve to provide constant voltage for the field circuits of other sectional drives appertaining to the same machinery.

The field winding 5 of the main generator G receives constant excitation from buses 15 and 16 through a speed-control rheostat 17. Connected across buses 15 and 16 are two voltage-dividing rheostats 18 and 19. Rheostat 18 serves to set the average winding tension of the drive in accordance with a desired value, while the setting of rheostat 19 determines the high empty reel speed at which the drive is to operate during threading operations. A slider of rheostat 18 is normally connected to the pattern field winding 9 of regulating generator R through the contact 21 of a switch S. Consequently, the pattern field winding 9 is normally excited by constant voltage from buses 15 and 16 in accordance with the voltage adjustment of rheostat 18. Switch S has four other contacts denoted by 22, 23, 24 and 25. When switch S is actuated to open contact 21, the pattern field winding 9 is disconnected from the rheostat 18 and is instead connected by contact 22 to the slider of rheostat 19. At the same time, the pilot field winding 8 is shorted and instead the pilot field winding 10 is connected across the motor armature 1 through a calibrating rheostat 26, while the circuit of the differential field winding 3 of motor M is interrupted.

With switch S in its normal, illustrated position, the motor field winding 3 is connected across the series arrangement of motor armature 1 and pilot field winding 8 so as to be energized substantially in proportion to the motor speed. The circuit of field winding 3 includes a rheostat 27 which is ganged-up with the speed-control rheostat 17 so that its setting is automatically changed when the rheostat 17 is adjusted for a different reeling speed. Series-connected with rheostat 27 is a compensation-adjusting resistor 28 whose setting can be varied at will but need not be changed during the operation of the drive.

The system is equipped with a main contactor C whose coil 31 controls four contacts denoted by 32, 33, 34 and 35. When contactor C is in the illustrated dropped-out condition, its contact 33 connects a dynamic braking resistor 36 across the motor armature 1 in order to secure a fast braking of the motor when the drive is to be stopped. Contact 34 controls the adjustment of a calibrating resistor 37 in the shunt circuit of the self-exciting field winding 7. This resistor may be rated so that when contact 34 is closed, the resistance line of the self-excited field circuit is approximately coincident with the no-load saturation characteristic of the regulating generator R. When contact 34 opens, the resistance value of the self-excited field circuit is increased in order to enforce a rapid decline of the voltage generated by the armature 6 of the regulating generator R.

The coil 31 of contactor C is energized from the constant-voltage buses 15 and 16 under control by a normally open start contact 38 and a normally closed stop contact 39. The coil circuit extends also through a normally closed contact 40 of a protective relay whose coil 41 is connected in the circuit of the motor differential field winding 3. Coil 41 is sufficiently excited to open the contact 40 only when the current in the circuit of field winding 3 exceeds a given maximum value.

When the start contact 38 is actuated, coil 31 is energized so that contactor C picks up and closes the armature circuit of the variable-voltage system. The self-sealing contact 35 of contactor C maintains coil 31 energized until either the stop contact 39 is actuated or the contact 40 of the protective relay P opened. With contactor C picked up, the motor M is energized from generator G which provides a voltage depending upon the selected adjustment of the speed-control rheostat 17. This voltage is modified by the booster voltage generated in armature 6. The regulation is such that the current flowing through the pilot field winding 8 remains constant. Consequently, the resultant voltage impressed across the motor armature 1 varies to the extent necessary to maintain the motor armature current at a constant value. If the motor received only constant field excitation from its main field winding 2, the drive would operate the reel core at constant torque substantially in accordance with characteristic B in Fig. 1. However, the differential motor field 3, excited in dependence upon the motor speed, imposes a modifying field control on the motor M with the effect of modifying the speed-torque characteristic so that the drive operates with variable torque and simultaneously variable tension as typified by the speed-torque characteristic c or d in Fig. 1. This modifying effect comes about as follows.

Since the differential motor field winding 3 is excited across the armature of the reel motor, its excitation will change as the reel of material builds up on the driven core. At empty reel when the speed and armature voltage of motor M are highest, the excitation of the differential field winding 3 is a maximum, and hence reduces the resultant motor field. Thus, the value of the driving torque is correspondingly reduced. At full reel when the speed and armature voltage of the motor are low, the excitation of the differential motor field 3 is considerably reduced, the net motor field is greater, and the value of torque is correspondingly increased. The rate at which the torque is changed as the reel builds up is adjustable by means of the resistor 28. Consequently, by changing the adjustment of resistor 28, the desired speed-torque characteristic, for instance either characteristic c or d, can be chosen in accordance with the particular material to be wound. The rheostat 27 has the effect of changing the resistance in the differential motor field circuit in accordance with the change in the main generator voltage, thus compensating for voltage changes due to changes in the traveling speed of the reeling material.

The drive would tend to run away in the event of a film break. This, however, is prevented by the protective relay P which causes the contactor C to drop out and to stop the motor if the current in the differential field circuit exceeds a predetermined maximum value. When the switch S is actuated, the motor differential field winding 3 is disconnected so that then the field excitation of the motor remains constant. At the same time, the current-responsive pilot field winding 8 of the regulating generator R is shorted so that this generator no longer responds to variations in the motor armature current. Instead, the circuit of the auxiliary pilot field 10 is closed at contact 23. Since this pilot field is energized across the motor armature 1, and since, due to the actuation of switch S, the circuit of the pattern field winding 9 is recalibrated for the speed setting of rheostat 19, the drive is now regulated for maintaining a substantially constant threading speed.

Figure 3:
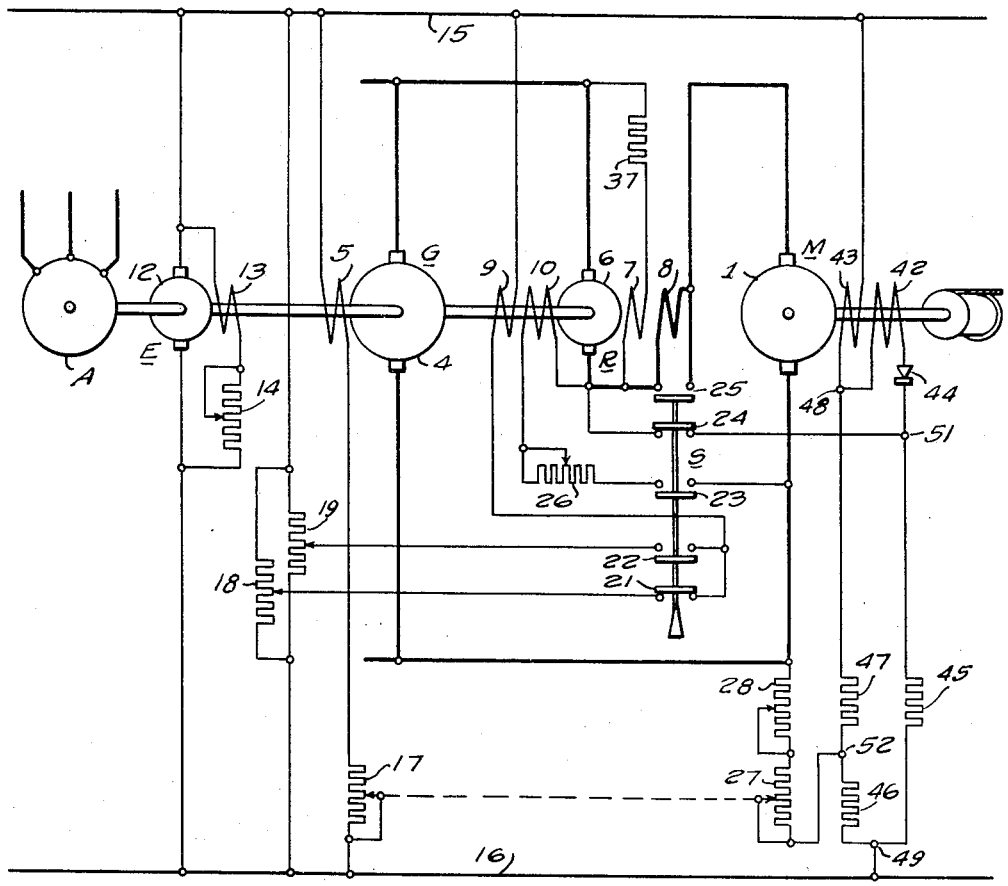

The embodiment illustrated in Fig. 3 is similar to the one described above, with the exception of a modified arrangement and control of the motor field circuits. The main contactor, dynamic braking resistor and protective relay are omitted in Fig. 3, although it will be understood that similar elements may be applied.

According to Fig. 3, the armature 1 of motor M is energized from the armature 4 of a main generator 5 in series with the armature 6 of a regulating generator R. The field circuits of the regulating generator R and of the main generator G, as well as the exciter E, auxiliary motor A and switch S, are identical with the corresponding elements and devices of Fig. 2 and are denoted by corresponding reference numerals, so that the following description may be limited to the differently designed motor field circuits of the embodiment shown in Fig. 3.

Motor M is equipped with a main field winding 42 and a speed-limiting field winding 43. These field windings are cumulative with respect to each other. A rectifier 44 is series-connected with winding 42 in order to prevent reversal of current. Winding 42 and rectifier 44 are disposed in a loop circuit which extends through resistors 45, 46 and 47 and forms part of a Wheatstone-bridge network whose four terminal points are denoted by 48, 49, 51 and 52. Terminal points 48 and 49 are attached to the constant-voltage buses 15 and 16 respectively, in series with the speed-limiting field winding 43. Consequently, the bridge network is energized by current of constant voltage so that field winding 42 receives a component constant excitation. Bridge terminal points 51 and 52 are normally connected across the series arrangement of motor armature 1 and pilot field winding 8 in series with the rheostats 27 and 28. Consequently, a second component voltage is impressed on the bridge network and this voltage varies substantially in accordance with the motor speed at a ratio determined by the setting of rheostats 27 and 28. As a result, a variable component excitation is superimposed on the main field winding 42 and acts differentially with respect to the above-mentioned constant excitation. The resultant motor field is therefore modified in substantially the same way as in the embodiment of Fig. 2, so that the speed-torque characteristic of the drive is as typified by curves c and d in Fig. 1.

Instead of using only one main field winding 42 in motor M and inserting resistors in the three other branches of the bridge network, it is also possible to equip motor M with two cumulatively acting main field windings disposed in two diagonally opposite branches of the bridge network. Such a modification is illustrated in Fig. 4 by a straight-line circuit diagram showing only the motor field circuits, since in all other respects the system may be similar to that of Fig. 3.

Figure 4:
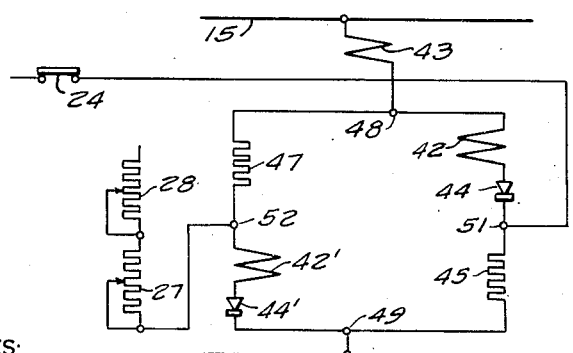

In Fig. 4, the terminal points 48 and 49 of the bridge network are connected across the constant voltage terminals 15 and 16 in series with the speed-limiting motor field winding 43, while the terminals 51 and 52 are connected to the switch contact and two resistors 27 and 28 in the same manner as the bridge network of the motor field circuits shown in Fig. 3. However, in addition to the motor field winding 42 with the appertaining rectifier 44, a second main motor field winding 42' with an appertaining rectifier 44' are provided in the modification of Fig. 4. Windings 42 and 42' lie in opposite bridge branches. The two other branches are formed by resistors 45 and 47. Each of windings 42 and 42' is controlled in the manner described above with reference to Fig. 3, and the two field windings 42 and 42' are wound for cumulative performance.

Figure 5:
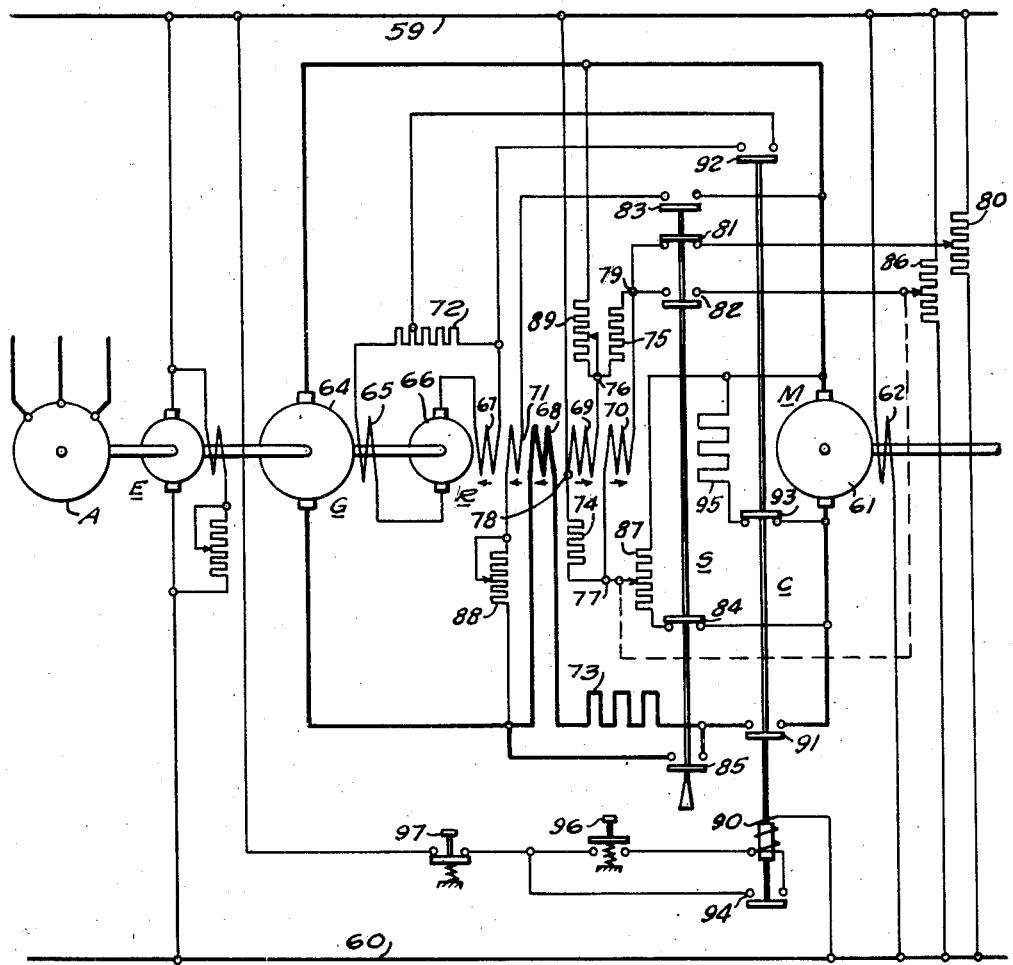

In the embodiment according to Fig. 5, the reel motor M operates at constant field and the regulated value of its armature current is changed as the reel builds up. Excitation for the motor field winding 62 is provided from constant-voltage buses 59 and 60 connected to a suitable current source, for instance, an exciter E driven by a constant-speed motor A. The armature 61 of reel motor M is connected across the armature 64 of a main generator G whose field winding 65 receives variable excitation from the armature 66 of a regulating generator R under control by a self-excited field winding 67, a pilot field winding 68, two cumulative pattern field windings 69, 70 and an auxiliary pilot field winding 71. Pattern field windings 69 and 70 are differential with respect to the pilot field windings 68 and 71 and balanced by the pilot field windings when the voltage across the armature 66 of the regulating generator has the value required for maintaining the main generator output at a varying current as the winder reel builds up. The armatures 64 and 66 operate at constant speed and may be driven as shown by the motor A.

The self-excited field winding 67 is shown to be series-connected with the armature 66, although a shunt or compound arrangement may also be used. The circuit of field winding 67 includes a calibrating resistor which as to connection and purpose corresponds to resistor 37 in Fig. 2. The pilot field winding 68 of regulating generator R is connected in the armature circuit of the main generator and motor in series with a resistor 73. Consequently, the excitation of the pilot field winding 68 is proportional to the motor armature current as in the examples previously described.

The pattern field windings 69 and 70 are connected with resistors 74 and 75 in the loop circuit of a Wheatstone-bridge network whose terminal points are denoted by 76, 77, 78 and 79. Bridge terminal point 78 is connected to the exciter bus 59. The opposite bridge terminal point 79 is connected to the slider of a potentiometric tension-setting rheostat 80 through a normally closed contact 81 of a switch S. Consequently, the pattern field windings 69 and 70 receive a component excitation of a normally constant value determined by the setting of rheostat 80. Switch S has four additional contacts denoted by 82, 83, 84 and 85. Contact 82, when closed, connects the bridge terminal 79 to the slider of a speed-setting rheostat 86 so that the constant component excitation of the pattern field windings 69 and 70 is changed to such a value as required for threading operations. Contact 84 normally connects a potentiometric rheostat 87 across the motor armature 61 and contact 83, when closed, connects the auxiliary pilot field winding 71 across the motor armature 61; while, at the same time, the pilot field winding 68 is shorted by contact 85, the rheostat 87 disconnected at contact 84 and the pattern field bridge circuit switched over for excitation from the rheostat 86.

The terminal point 77 of the pattern field bridge network is attached to the slider of rheostat 87 and this slider is ganged-up with that of the speed-control rheostat 86. The opposite bridge terminal 76 is connected to the motor armature circuit through a rheostat 88 so that the voltage impressed across terminals 76 and 77 is proportional to the motor armature voltage, the proportion being determined by the setting of rheostat 87. It will thus be recognized that a second component excitation is impressed on the pattern field windings 69 and 70 which varies in accordance with the motor speed. This second component is differential with respect to the above-mentioned constant component of excitation of the pattern field winding. Consequently, the resultant pattern field excitation of the regulating generator is modified. This modification is such that the speed-torque characteristic of the drive, normally similar to that represented by curve *b* in Fig. 1, is changed toward curve *a* so as to result in a variable-torque and variable-tension characteristic of the type indicated by curve *c* or *d*.

The system of Fig. 5 is also equipped with a main contactor C whose coil 90 controls four contacts denoted by 91, 92, 93 and 94. Contact 93 connects a dynamic braking resistor 95 across the motor armature 61 when contactor C is dropped out. Coil 90 of contactor C is energized from constant-voltage buses 59 and 60 under control by a normally open start contact 96 and a normally closed stop contact 97. Actuation of contact 94 causes the contactor to pick up and to maintain its coil 90 energized through the self-holding contact 94. At the same time, the dynamic-braking resistor 95 is disconnected, and the resistor 72 in the self-excited field circuit of the regulating generator is calibrated to make the resistance line of this circuit approximately coincident with the unsaturated linear portion of the magnetic characteristic of generator R. With switch S in the illustrated position, the drive then operates so that the voltage impressed on motor armature 61 by generator G is varied so that the motor current at any moment has a value determined by the resultant excitation of the pattern field windings 69 and 70. Since this excitation changes automatically with changes in motor speed, the current applied to the motor is changed toward smaller values as the reel of material builds up on the driven core.

When the switch S is placed in position for threading speed, the pilot field winding 68 becomes ineffective. Instead, auxiliary pilot field winding 71 is excited, but this excitation no longer depends upon the motor current but is controlled in proportion to the motor speed. At the same time, the excitation of the pattern field windings 69 and 70 is recalibrated to a different value. As a result, the drive is now self-regulating to maintain the speed desired for threading and the like operations.

It will be recognized by those skilled in the art after a study of this disclosure that variable-voltage systems for core-type reel drives according to the invention may be modified in various respects and may be embodied by circuits different from those specifically shown and described, without departing from the objects and principles of my invention and without departing from the essential features of the invention as set forth in the claims annexed hereto.

I claim as my invention:

1. A core-type reel drive, comprising a Ward Leonard system having a driving dynamo, a main generating dynamo with an armature circuit connected to said driving dynamo to provide energization therefor, and a regulating dynamo connected with said main dynamo for regulating said energization and having two mutually differential control field circuits; current supply means of substantially constant voltage connected to one of said control field circuits to provide normally constant excitation therefor, said other control field circuit being connected to said armature circuit to be excited in dependence upon the current in said armature circuit so that said regulating dynamo control the speed-torque characteristic of said driving dynamo by current-responsive regulation of the voltage impressed by said armature circuit across said driving dynamo; regulating field means associated with one of said dynamos; circuits means connected to said driving dynamo to provide a voltage substantially proportional to the speed of said driving dynamo, said circuit means being connected to said field means with the polarity of connection required to cause said field means to superimpose a corrective regulation on said driving dynamo in a sense opposite to said current-responsive regulation, and said field means having ampere-turns dimensioned for maintaining said speed-torque characteristic in a predetermined condition between constant-torque and constant-pull characteristics.

2. A core-type reel drive, comprising a Ward Leonard system having a driving dynamo, a main generator with an armature circuit connected to said driving dynamo to provide energization therefor, and a regulating dynamo connected with said generator for regulating said energization and having two mutually differential control field windings, current supply means of substantially constant voltage connected to one of said field windings to provide excitation therefor, said other field winding being connected to said armature circuit to be excited in dependence upon the current in said armature circuit so that said regulating dynamo controls the speed-torque characteristic of said driving dynamo by current-responsive regulation of the voltage impressed by said armature circuit across said driving dynamo; a regulating field winding in one of said dynamos, a circuit connected across said driving dynamo to provide a voltage substantially proportional to the speed of said driving dynamo and being connected to said regulating field winding with the polarity of connection required to cause said regulating field winding to superimpose a corrective regulation on said driving dynamo in a sense opposite to said current-responsive regulation, and said regulating field winding having ampere-turns rated for maintaining said speed-torque characteristic in a predetermined condition between constant-torque and constant-pull characteristics.

3. In a core-type reel drive according to claim 1, said driving dynamo having a main field winding, current supply means of substantially constant voltage attached to said main field winding to provide normally constant excitation therefor, and said regulating field means being associated with said driving dynamo in differential relation to said main field winding.

4. In a core-type reel drive according to claim 1, said regulating field means being disposed in said regulating dynamo in cumulative relation to said other control field circuit.

5. A core-type reel drive, comprising a Ward Leonard system having a reel motor and a main generator with a common armature circuit, said system having current-regulating means connected with said armature circuit to be responsive to the current in said circuit for maintaining said current at a constant value, said motor having two mutually differential field circuits, current supply means of substantially constant voltage connected to one of said field circuits for providing a component field excitation of normally constant value, said other field circuit being connected to said armature circuit across said motor to provide a variable component field excitation dependent upon the motor speed for increasing the motor torque with decreasing speed.

6. A core-type reel drive, comprising a Ward Leonard system having a reel motor and a main generator with an armature circuit connected to said motor to provide energization therefor and a regulating generator disposed for regulating said energization, said regulating generator having a current-responsive field circuit connected to said armature circuit to provide a first component excitation according to the current in said armature circuit, said regulating generator having a second field circuit to provide a normally constant second component field excitation, current supply means of substantially constant voltage connected to said second field circuit with the polarity needed to have said second component balance said first component when said current has given value, said regulating generator having a third field circuit connected to said armature circuit across said motor to provide a third component field excitation dependent upon the motor speed, said third field circuit having the polarity of connection needed for increasing said regulated current value with decreasing speed.

7. A core-type reel drive, comprising a Ward Leonard system including a reel motor and a main generator having a common armature circuit and a regulating generator having an armature series-connected in said armature circuit, said regulating generator having two mutually balanceable control field circuits, current supply means of substantially constant voltage connected to one of said control field circuits for exciting the latter, said other field circuit being connected to said armature circuit to be excited in dependence upon the current of said armature circuit so that said regulating generator controls the speed-torque characteristic of said motor by current-responsive regulation of the voltage impressed by said armature circuit across said motor, said motor having a separately excited main field winding and a regulating field winding, current leads of substantially constant voltage attached to said main field winding, said regulating field winding being connected to said armature circuit across said motor to be excited substantially in proportion to the speed of said motor for superimposing on said motor a corrective regulation in a sense opposite to said current-responsive regulation, said regulating field winding being poled to oppose said main field winding and rated for modifying said speed-torque characteristic to maintain it in a predetermined condition between constant-pull and constant-torque characteristics.

8. A core-type reel drive, comprising a Ward Leonard system having a driving dynamo, a main generating dynamo with an armature circuit connected to said driving dynamo to provide energization therefor, and a regulating dynamo connected with said main dynamo for regulating said energization and having two mutually differential control field circuits; current supply means of substantially constant voltage connected to one of said control field circuits to provide normally constant excitation therefor, said other control field circuit being connected to said armature circuit to be excited in dependence upon the current in said armature circuit so that said regulating dynamo controls the speed-torque characteristic of said driving dynamo by current-responsive regulation of the voltage impressed by said armature circuit across said driving dynamo; a field winding in said generating dynamo, an adjustable control rheostat connecting said field winding to said current supply means for adjusting the excitation of said winding in accordance with a desired basic reeling speed, a regulating field winding in one of said other dynamos; circuit means connected to said driving dynamo to provide a voltage substantially proportional to the speed of said driving dynamo, said circuit means being connected to said regulating field means with the polarity of connection required to cause said regulating field means to superimpose a corrective regulation on said driving dynamo in a sense opposite to said current-responsive regulation, said regulating field means having ampere-turns rated for maintaining said speed-torque characteristic in a predetermined condition between constant-torque and constant-pull characteristics, and a rheostat forming part of said circuit means and being ganged together with said control rheostat so as to increase the excitation of said regulating field means when said control rheostat is adjusted for higher reeling speeds.

9. In a core-type reel drive according to claim 7, said main generator having a field winding connected to said current supply means to receive normally constant excitation, a speed control rheostat interposed between said main generator field winding and said current supply means for adjusting the value of said constant excitation, and another rheostat connected with said regulating field winding and ganged together with said control rheostat for increasing the excitation to speed ratio of said regulating winding with speed-increasing adjustment of said control rheostat.

10. A core-type reel drive, comprising a Ward Leonard system having a drive motor, a main generator and a regulating generator, said main generator and said motor having respective field windings and respective armatures, said armatures having a common armature circuit, current supply means of normally constant voltage connected to said motor field winding, said regulating generator having an armature connected to said main generator field winding for exciting it by variable voltage and having three field control circuits for jointly controlling said voltage, one of said field circuits being connected with said armature circuit to be excited in proportion to the current in said armature circuit, a second one of said field control circuits being connected to said current supply means to receive normally constant excitation and poled to oppose said first field control circuit relative to the control of said voltage, said third field control circuit being connected across said motor armature to be excited in dependence upon the motor speed and disposed to act cumulatively to said first circuit as regards the control of said voltage so as to increase the regulated value of motor armature current with decreasing motor speed.

11. A core-type reel drive, comprising a Ward Leonard system having a reel motor and a main generator with a common armature circuit, said system having current-regulating means connected with said armature circuit to be responsive to the current in said circuit for maintaining said current at a constant value, said motor having a field winding, a bridge network having a loop arrangement of four series-connected branches and having two pairs of diagonal points between said respective branches, said motor field winding being disposed in one of said branches, current supply means of substantially constant voltage connected to one of said pairs of diagonal points, a circuit attached to said armature circuit across said motor to provide a regulating voltage dependent upon the motor speed and connected to said other pair of diagonal points so that said field winding is excited by the differential effect of said two voltages in order to vary the motor torque in less than inverse proportion to speed.

12. With a core-type reel drive according to claim 1, in combination, selectively actuable means for setting the drive to operate at a predetermined low threading speed, comprising a selector switch movable between two positions and having four contact devices, two of said contact devices being connected with said regulating field means and said other control field circuit respectively so as to render them operative when said switch is in one of said positions and inoperative when said switch is in the other position, a third contact device being connected with said one control field circuit and said current supply means for switching said one field circuit from a normal to a low value of said constant excitation when said switch is moved from one to the other position, and a third control field circuit associated with said regulating generator in differential relation to said one control field circuit and connected to said armature circuit across said driving dynamo to provide a voltage dependent upon the drive speed, said third circuit being connected to said fourth contact means to render said third control field circuit operative only when said switch is in said other position.

13. A core-type reel drive, comprising a Ward Leonard system having a reel motor and a main generator with a common armature circuit and including a regulating generator disposed for regulating the current in said armature circuit, said regulating generator having two pilot field windings and a pattern field winding differentially related to said pilot field windings, selective switch means movable between two positions and having a plurality of contact means, current supply means of substantially constant voltage having voltage-divider means connected to said pattern field winding under control by one of said contact means so as to apply to said pattern field winding high voltage when said switch means is in one of said positions and low voltage when said switch means is in the other position, circuit connections attached to said armature circuit to provide a pilot voltage proportional to the current in said armature circuit and being connected to one of said pilot field windings and to another one of said contact means so that said one pilot field winding is energized only when said switch means is in said one position, and circuit means connected to said armature circuit across said motor to provide a pilot voltage dependent upon the motor speed and being connected to said other pilot field winding under control by a third one of said contact means to energize said other pilot field winding only when said switch means is in the other position, whereby said armature current is controlled by said regulating generator in response to current for normal operation of said motor when said switch means is in said one position and in response to voltage for constant low-speed operation when said switch means is in said other position.

14. A core-type reel drive, comprising a Ward Leonard system including a reel motor and a main generator having a common armature circuit and a regulating generator having an armature series-connected in said armature circuit, said regulating generator having mutually balanceable pattern field means and pilot field means respectively, selective contact means movable between two positions for reeling operation and threading operation respectively of said motor, a current supply circuit having voltage-dividing rheostat means connected to said pattern field means under control by said contact means to provide high pattern excitation when said contact means are in one position and low pattern excitation when said contact means are in the other position, first circuit means connecting said pilot means with said armature circuit for energizing said pilot means in accordance with the current in said armature circuit, second circuit means connecting said pilot means to said motor for energizing said pilot means in dependence upon the motor speed, said first and second circuit means connected to and controlled by said contact means so that said first circuit means is operative only when said contact means are in said one position while said second circuit means is operative only in said other position of said contact means.

ALBERT T. BACHELER.

REFERENCES CITED

The following references are of record in the file of this patent:

UNITED STATES PATENTS

| Number | Name | Date |
|---|---|---|
| 2,205,204 | King | June 18, 1940 |
| 2,278,519 | King et al. | Apr. 7, 1942 |
| 2,300,988 | Stephenson | Nov. 3, 1942 |
| 2,420,884 | King et al. | May 20, 1947 |